United States Patent [19]

Ong et al.

[11] Patent Number: 4,983,482
[45] Date of Patent: Jan. 8, 1991

[54] PHOTOCONDUCTIVE IMAGING MEMBERS WITH POLYURETHANE HOLE TRANSPORTING LAYERS

[75] Inventors: Beng S. Ong; Dasarao K. Murti, both of Mississauga; Lupu Alexandru, Toronto, all of Canada

[73] Assignee: Xerox Corporation, Stamford, Conn.

[21] Appl. No.: 332,650

[22] Filed: Apr. 3, 1989

[51] Int. Cl.$^5$ .............................. G03G 5/14
[52] U.S. Cl. ....................... 430/59; 528/85; 252/500; 430/96
[58] Field of Search ................ 528/85; 430/58, 59

[56]         References Cited
         U.S. PATENT DOCUMENTS

| | | | |
|---|---|---|---|
| 4,001,014 | 1/1977 | Ando et al. | 430/31 |
| 4,007,043 | 2/1977 | Stolka et al. | 430/31 |
| 4,226,967 | 10/1980 | Tazuke et al. | 528/74 |
| 4,293,630 | 10/1981 | Oka | 430/59 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,937,165 | 6/1990 | Ong | 430/59 |

*Primary Examiner*—David Welsh
*Attorney, Agent, or Firm*—E. O. Palazzo

[57]         ABSTRACT

A layered photoresponsive imaging member comprised of a photogenerating layer, and in contact therewith a hole transporting layer comprised of charge transport polyurethanes of the following formula, optionally doped with a charge transport compound, or optionally dispersed in an inert resinous binder:

wherein A, B and Z are independently selected from the group of bifunctional linkages; R is an alkyl or aryl group; Ar is an aryl or substituted aryl group; x and y represent the mole fractional numbers of the polyurethane structural composition units, subject to the provision that x is greater than 0 and that the sum of x and y is equal to 1.0; and n represents the number of repeating segments.

28 Claims, 1 Drawing Sheet

PHOTOCONDUCTIVE IMAGING MEMBERS WITH POLYURETHANE HOLE TRANSPORTING LAYERS

BACKGROUND OF THE INVENTION

This invention is generally directed to photoresponsive imaging members, and more specifically the present invention is directed to layered photoresponsive imaging members with a charge transporting layer comprised of certain charge transporting polyurethanes. Thus, in one embodiment the present invention relates to an imaging member comprised of a photogenerating layer, and a charge or hole transport layer comprised of charge transport polyurethanes. Further, in another embodiment of the present invention there is provided an imaging member comprised of a supporting substrate, a hole transport layer comprised of fluorene-based polyurethanes of the formulas illustrated herein, and situated therebetween a photogenerating layer. Additionally, the present invention includes within the scope thereof imaging members wherein the photogenerating layer is situated between the hole transporting layer, and the supporting substrate. The photoresponsive imaging members of the present invention are useful for incorporation into various imaging systems, particularly xerographic imaging processes wherein, for example, the members are initially charged negatively, and development is accomplished by dry or liquid developer compositions. Also, the aforementioned novel charge transporting polyurethanes of the present invention possess excellent hole transport properties; are substantially resistant to liquid and dry developer compositions in that, for example, they are free of crystallization, a disadvantage associated with many prior art hole transport compounds such as those illustrated in U.S. Pat. No. 4,265,990 when liquid developers are selected; and further with the polyurethanes of the present invention resinous binders can be avoided. Furthermore, the layered photoresponsive imaging members of the present invention are durable, possess acceptable dark decay characteristics, and are insensitive to changes in environmental conditions such as humidity and temperature. Also, the polyurethanes of the present invention can be formed into films enabling, for example, flexible imaging belts, including seamless belts. Moreover, the polyurethanes of the present invention can be readily synthesized by known economic processes.

The generation and development of electrostatic latent images on the surfaces of photoconductive members by electrostatic means is well known. One electrostatic method involves the formation of a latent image on the surface of a photoreceptor. These photoreceptors can be comprised of a conductive substrate containing on its surface a layer of photoconductive insulating material, and in many instances there can be incorporated therein a thin barrier layer between the substrate and the photoconductive layer to prevent charge injection into the photoconductive layer upon charging of its surface, which injection would adversely affect the quality of the resulting image.

Numerous different xerographic photoconductive members are known including, for example, a homogeneous layer of a single material such as vitreous selenium, which can function as both a photogenerating and hole transporting substance, or composite layered devices with a photoconductive substance dispersed in other substances. An example of one type of composite photoconductive layer used in xerography is described, for example, in U.S. Pat. No. 3,121,006 wherein there is disclosed a number of layers comprising finely divided particles of a photoconductive inorganic compound dispersed in an electrically insulating organic resin binder.

As more advanced, higher speed electrophotographic copiers, duplicators and printers were developed, degradation of image quality was encountered during cycling. Moreover, complex, highly sophisticated duplicating and printing systems operating at high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. There is also a current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, for example, less than about 0.75 inch (19 millimeters) diameter, raise the threshold of mechanical performance criteria for photoreceptors to such a high level that spontaneous photoreceptor belt material failure becomes a frequent event for flexible belt photoreceptors.

There are also known photoreceptor members comprised of other inorganic or organic materials wherein the charge carrier generation and charge carrier transport functions are accomplished by discrete contiguous layers. Additionally, photoreceptors are disclosed in the prior art which include an overcoating layer of an electrically insulating polymeric material, and in conjunction with this overcoated type photoreceptor there have been proposed a number of imaging methods.

Specifically, there have been disclosed layered photoresponsive imaging members comprised of photogenerating layers and aryl amine hole transport layer, in U.S. Pat. No. 4,265,990, the disclosure of which is totally incorporated herein by reference. Examples of photogenerating layers include trigonal selenium and phthalocyanines, while examples of the active transport layer molecules that may be employed are comprised of the aryl amines illustrated in the '990 patent. The imaging members of the present invention may be considered similar to those described in the aforementioned patent with the primary exception that there are selected in place of the aryl amines the fluorene polyurethanes illustrated herein, which polyurethanes possess the improved characteristics disclosed herein, including permitting the rapid transport of holes, and no or minimal crystallization with dry, or liquid developer compositions. Also, the fluorene charge transport polyurethanes of the present invention can be selected for layered imaging members wherein a resinous binder is eliminated. Furthermore, the hole transport polyurethanes of the present invention possess excellent compatibility with common optional polymer binders such as polycarbonates, polyesters, poly(methyl methacrylate), polystyrene copolymers, and the like, thus ensuring excellent long-term stability of the transport layers. In addition, the polyurethane charge transport layers of the present invention can be further doped with suitable fluorene charge transport small molecules to enhance the transport capability for high speed printing and copying processes. Moreover, the hole transport polyurethanes selected for the imaging members of the present invention can be economically obtained by simple synthetic processes, and wherein the polyurethane products resulting are of exceptionally high purity thus enabling them to be very suitable for xerographic imaging methods.

Isopar, commonly employed in liquid developer inks, can substantially degrade the mechanical integrity and electrical properties of layered photoreceptors. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4, -oxadiazole; 1-phenyl-3-(4'-diethylaminostyryl)-5-(4''-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenyl amino phenyl)-ethylene; and N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a C10–C14 branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure. The leaching out of the activating small molecule also increases the susceptibility of the transport layer to solvent/stress cracking when the belt is parked over a belt support roller during periods of non-use. Some carrier fluids also promote phase separation of the activating small molecules, such as aryl amine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. Although flexing is normally not encountered with rigid, cylindrical, multilayered photoreceptors which utilize charge transport layers containing activating small molecules dispersed or dissolved in a polymeric film forming binder, electrical degradation is similarly encountered during development with liquid developers. Sufficient degradation of these photoreceptors by liquid developers can occur in less than eight hours of use thereby rendering the photoreceptor unsuitable for even low quality xerographic imaging purposes. These disadvantages are avoided or minimized with the imaging members of the present invention.

Photoreceptors have been developed which comprise charge transfer complexes prepared with polymeric molecules. For example, charge transport complexes formed with polyvinyl carbazole are disclosed in U.S. Pat. Nos. 4,047,948; 4,346,158 and 4,388,392. Photoreceptors utilizing polyvinyl carbazole layers exhibit relatively poor xerographic performance in both electrical and mechanical properties. Polymeric arylamine molecules prepared from the condensation or secondary diamine with a di-iodo aryl compound are disclosed in European Pat. No. 34,425, published Aug. 26, 1981, issued May 16, 1984. Since these polymers are extremely brittle and form films which are very susceptible to physical damage, their use in a flexible belt configuration is generally precluded.

Other prior art includes Canadian Pat. No. 1,171,431, corresponding to European Pat. No. 34,425, published Aug. 26, 1981, issued May 16, 1984, which describes condensation polymers of a secondary diamine with a di-iodo arly compound, for example, in working Examples IX and X;

Photoconductivity and Hole Transport in Polymers of Aromatic Amine-Containing Methacrylates, Journal of Polymer Science: Polymer Chemistry Edition, Vol. 21, 969 (1983), wherein hole transport is described for high molecular weight arylamine-substituted polymethacrylates; synthesis of the monomers, their polymerization, and the general properties of the polymers are also discussed;

U.S. Pat. No. 4,052,205, issued Oct. 4, 1977, discloses a photoconductive imaging member comprising various active polymers, such as poly-N-vinyl carbazole, in a transport layer, see line 45, column 5 to line 27, column 6. Derivatives of the active polymers may be hydroxy substituted, reference column 5, lines 62 to 5;

U.S. Pat. No. 4,265,990, issued May 5, 1981, discloses transport layers comprising small molecule arylamines and a polycarbonate resin binder;

U.S. Pat. No. 4,415,641, issued Nov. 15, 1983, discloses an electrophotographic light-sensitive element comprising a carbazole derivative (see column 3, lines 1 to 14);

U.S. Pat. No. 4,588,666, issued May 13, 1986, discloses a hole transporting molecule comprising alkoxy derivatives of tetra phenyl biphenyl diamine (see column 3, lines 33–66); $R_1$ and $R_2$ can represent alkoxy groups which include methoxy. Resins such as polyvinyl carbazoles, polycarbonate resins, epoxy resins, polyvinyl butyrals, polyhydroxyether resins may be used as a binder for the hole transporting molecule;

U.S. Pat. No. 4,047,948, issued Sept. 13, 1977, discloses a photoreceptor comprising layers which may contain polyvinyl carbazole. The use of small molecule arylamine activating compounds in transport layers is also disclosed;

U.S. Pat. No. 4,346,158, issued Aug. 24, 1982, discloses a photoreceptor comprising layers which may contain polyvinyl carbazole. The use of small molecule arylamine activating compounds in transport layers is also disclosed. The preferred small molecule resin binder is a polycarbonate resin;

U.S. Pat. No. 4,388,392, issued June 14, 1987, discloses a photoreceptor comprising layers which may contain polyvinyl carbazole. The use of an electron-donating polycyclic aromatic hydrocarbon incorporated in an electron-donating polymeric photoconductor in a charge transporting layer is also disclosed;

U.S. Pat. No. 4,273,846, issued June 16, 1981, discloses an imaging member comprising a polycarbonate resin material and an arylamine (see the general formula, column 2, lines 21 to 34). Poly-N-vinyl carbazole may be employed in the generator layer;

U.S. Pat. No. 3,844,781, issued Oct. 29, 1974, discloses various photoconductive materials containing substituents such as hydroxyl, amino and alkoxy groups;

U.S. Pat. No. 3,890,146, issued June 17, 1975, discloses various photoconductive materials containing substituents such as hydroxyl, amino and alkoxy groups; and U.S. Pat. No. 4,588,667, issued May 13, 1986, discloses various overcoated electrophotographic imaging members including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

Other representative prior art disclosing layered photoresponsive devices include U.S. Pat. Nos. 4,115,116; 4,047,949; 4,081,274 and 4,315,981. According to the disclosure of the '981 patent, the recording member consists of an electroconductive support, a photoconductive layer of organic materials which contain a charge carrier producing dyestuff layer of a compound having an aromatic, or heterocyclic polynuclear quinone ring system, and a charge transport layer.

Furthermore, there is disclosed in U.S. Pat. No. 4,135,928 electrophotographic light sensitive members comprised of 7-nitro-2-aza-9-fluorenylidene-malononitrile as charge transporting substances. According to the disclosure of this patent, the electrophotographic light sensitive members are comprised of an electroconductive support, a layer thereover of a photogenerating substance, and 7-nitro-2-aza-9-fluorenylidene-malononitrile of the formula, for example, as illustrated in column 1. There are also disclosed in U.S. Pat. No. 4,474,865 imaging members with electron transporting layers of fluorenylidene derivatives. In addition, there are also known layered photoresponsive imaging members wherein there are selected hole transport layers of aryl amines, and various photogenerating squaraine compounds, reference for example U.S. Pat. Nos. 4,552,822; 4,415,639; 4,471,041 and 4,486,520.

There are also illustrated in U.S. Pat. No. 4,618,551, the disclosure of which is totally incorporated herein by reference, photoresponsive imaging members with photogenerating layers, and charge transport layers comprised of polysilylenes. More specifically, there is illustrated in the aforementioned patent a polysilylene hole transporting compound for use in imaging members, which compound is of the formula as illustrated in claim 1 with specific examples of polysilylenes being poly(methylphenylsilylene) of an average molecular weight of greater than 50,000.

Also of interest is U.S. Pat. No. 4,106,934, which illustrates photoconductive insulating compositions containing one or more p-type organic photoconductor components and a charge transfer complex of one or more electron acceptor components of the formulas as illustrated in the Abstract, for example. Particularly useful as Formula 1 type compounds are those materials as illustrated in column 5, beginning at line 30. Further, the use of N-substituted polymeric acrylic acid amides and alpha-alkyl acid amides as overcoatings for photoconductors is illustrated in U.S. Pat. No. 3,307,940 (see Formula 5, column 2). Moreover, fluorenylidene derivatives as charge transporting compounds in photoreceptors are disclosed in U.S. Pat. Nos. 4,400,455; 4,245,021; 4,415,640; 4,559,287 and 4,562,132. In addition, U.S. Pat. No. 3,615,412 discloses organic photoconductors with certain fluorenes fused to benzo and naphtho ring structures, reference columns 1 to 3.

In addition, of interest is copending application U.S. Ser. No. 061,247, filed June 2, 1987, which illustrates a layered photoresponsive imaging member comprised of a photogenerating layer, and in contact therewith a hole transporting layer comprised of fluorene derivatives of the following formula dispersed in an inactive resinous binder:

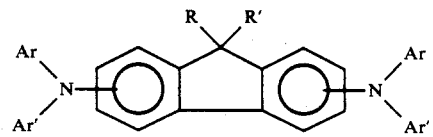

where R and R' are independently selected from the group consisting of hydrogen, alkyl, and substituted alkyl groups; and Ar and Ar' are independently selected from the group consisting of aryl and substituted aryl substituents. The following patent applications and U.S. patents are mentioned: (1) U.S. Ser. No. 07/061,064 discloses layered imaging members with novel polymeric, hydroxy and alkoxy aryl amines, wherein m is a number of between about 4 and 1,000, reference for example claims 1 and 2; (2) U.S. Ser. No. 061,247 and U.S. Ser. No. 07/198,254 illustrate imaging members with novel dihydroxy terminated aryl amine small molecules, reference claims 1 and 2, for example, (3) U.S. Pat. No. 4,806,444, the disclosure of which is totally incorporated herein by reference, describes layered imaging members with novel polycarbonate polymeric arylamines, reference claims 1 and 2, for example; (4) U.S. Pat. No. 4,806,443, the disclosure of which is totally incorporated herein by reference, illustrates novel polycarbonate polymeric amines useful in layered imaging members, reference claims 1 and 2, for example; and (5) U.S. Pat. No. 4,801,517, the disclosure of which is totally incorporated herein by reference, which discloses imaging members with novel polycarbonate arylamines, reference claims 1 and 2, for example.

In U.S. applications U.S. Ser. No. 274,159 and U.S. Ser. No. 274,160 entitled, respectively, PHOTOCONDUCTIVE IMAGING MEMBERS WITH N,N-BIS(BIARYLYL)ANILINE, OR TRIS(BIARYLYL)AMINE CHARGE TRANSPORTING COMPONENTS, and PHOTOCONDUCTIVE IMAGING MEMBERS WITH BIARYLYL DIARYLAMINE CHARGE TRANSPORTING COMPONENTS, the disclosures of which are totally incorporated herein by reference, there are described layered photoconductive imaging members with transport layers incorporating biarylyl diarylamines, N,N-bis(biarylyl)anilines, and tris(biarylyl)amines as charge transport compounds. In the above-mentioned applications, there are disclosed improved layered photoconductive imaging members comprised of a supporting substrate, a photogenerating layer, optionally dispersed in an inactive resinous binder, and in contact therewith a charge transport layer comprised of the above-mentioned charge transport compounds, or mixtures thereof dispersed in resinous binders.

The fluorene polyurethanes of the present invention differ from the aforesaid charge transport compounds in that, for example, the invention charge transport polymer systems are derived from fluorene hole transport structures. More importantly, the charge transport moieties of the polymers of the present invention are covalently bonded to the backbones via the C-9 carbon atom of the fluorene structure, and are pendent to their polymer backbones. The fluorene transport moieties are forced into assuming an intimate face-to-face stereochemical relationship resulting in optimum electronic interactions between these fluorene moieties. The close interactions as described herein promote and enhance the overall charge transport capability of these charge transport polymeric systems. In contrast, the transport moieties of many of the above cited applications form an integral part of their polymer backbones, thus drastically inhibiting these structures from close electronic interaction.

Although imaging members with various hole transporting substances, including arylamines and polysilylenes, and the amines and anilines of U.S. Ser. Nos. 274,159 and 274,160 are suitable for intended purposes, there continues to be a need for the development of improved members, particularly layered members which are comprised of fluorenebased polyurethane transport layers; and which members are inert to crystallization and insensitive to the changes in environmental conditions. Moreover, there continues to be a need for specific layered imaging members which not only generate acceptable images, but which can be repeatedly used in a number of imaging cycles without deterioration thereof from the machine environment or surrounding conditions. Additionally, there continues to be a need for improved layered imaging members wherein the materials employed for the respective layers, particularly the hole transporting layer, are substantially inert. Further, there continues to be a need for improved photoresponsive imaging members, which can be prepared with a minimum number of processing steps, and wherein the layers are sufficiently adhered to one another to allow the continuous use of these members in repetitive imaging processes. There also is a need for new hole transporting substances with excellent charge transport mobilities. Likewise, there is a need for hole transporting layers with increased stability, for example, wherein there is essentially no bleeding and segregation or crystallization of transport molecules after an extended number of imaging cycles. Furthermore, there is a need for hole transporting polymers useful in layered imaging members, which polymers are superior insulators in the dark compared to many other known hole transporting compounds, thus enabling charging of the resulting imaging member to higher fields while maintaining cyclic stability, and allowing improved developability, especially with liquid developer compositions. Additionally, there is a need for enabling the preparation of imaging members with new hole transporting polymers wherein the preparation allows for the selection of a variety of solvents, inclusive of toluene, benzene, tetrahydrofuran, cyclohexane, and halogenated solvents in addition to methylene chloride. There is also a need for imaging members with improved electrical characteristics, and comprised of hole transporting fluorene polyurethanes, which members can be positively or negatively charged depending on the configuration of the member. Another need of the present invention resides in the provision of a novel class of hole transport polyurethanes whose physical, electrical and electrochemical properties can be modified by altering the two amino substituents on the fluorene structure. Moreover, there continues to be a need for synthetic processes for the preparation of fluorene hole transporting polyurethanes useful in the layered imaging members of the present invention. There is also a need for imaging members wherein there can be selected the charge transporting polyurethanes illustrated herein, which polyurethanes need not be dispersed in resinous binders.

SUMMARY OF THE INVENTION

It is, therefore, an object of the present invention to provide an improved photoresponsive member with many of the advantages indicated herein.

It is yet another object of the present invention to provide an improved photoresponsive imaging member with novel hole transporting polyurethanes.

A further specific object of the present invention is the provision of an improved photoresponsive imaging member containing a photogenerating layer, and in contact therewith a hole transporting layer of fluorene-based polyurethanes.

Another specific object of the present invention is the provision of an improved photoresponsive imaging member containing a photogenerating layer, and in contact therewith certain fluorene polyurethanes as the hole transporting layer.

Yet another object of the present invention resides in the provision of an improved overcoated photoresponsive imaging member with a photogenerating composition layer situated between the hole transport layer and a supporting substrate.

In another object of the present invention there are provided processes for affecting preparation of the hole transporting polyurethanes disclosed hereinafter.

In yet another object of the present invention there are provided imaging and printing methods, including xerographic processes, utilizing the improved photoresponsive imaging member of the present invention.

In still yet another object of the present invention there are provided hole transporting polyurethanes which are compatible with common matrix binders, inclusive of polycarbonates, enabling the dispersion of these compounds to be maintained for extended time periods with or without the use of stabilizers.

Another object of the present invention resides in the provision of single-component charge transport layers which are devoid of the problems of the phase separation, crystallization and leaching of charge transport compounds.

A further object of the present invention is to provide efficient charge transport layers comprised of charge transport polyurethanes doped with suitable charge transport compounds.

Moreover, in another object of the present invention is the provision of novel hole transport polyurethanes which are environmentally safe and inert to the users thereof.

A further object of the present invention is to provide novel hole transport polyurethane layers whose electrical performance is insensitive to changes in environmental conditions.

These and other objects of the present invention are accomplished by the provision of an improved photoresponsive imaging member comprising a photogenerating layer and a charge, or hole transporting layer in contact therewith. More specifically, the present invention in one embodiment is directed to a photoresponsive imaging member comprised of a photogenerating layer situated between a copolyurethane hole transporting layer, and a supporting substrate.

The preferred hole transporting polyurethanes selected for the present invention are represented by the following Formula I:

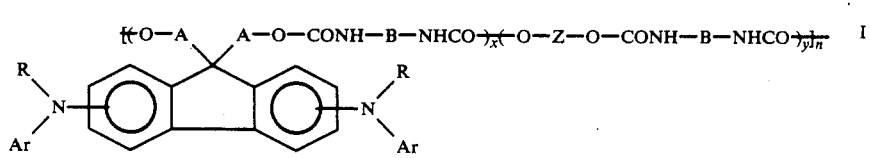

wherein A, B and Z are independently selected from the group of bifunctional linkages such as alkylene, arylene, substituted alkylene, substituted arylene, ether and polyether segments; R is an alkyl or aryl group; Ar is an aryl group; or mixtures thereof; x and y represent the mole fraction numbers of the structural composition units, subject to the provision that x is greater than 0 and that the sum of x and y is equal to 1.0; and n is the number of polyurethane composition units, preferably of, for example, from 5 to about 1,000, and more preferably from about 10 to about 300.

Illustrative examples of alkylene groups include those containing from about 1 to about 25 carbon atoms, and preferably from 1 to about 10 carbon atoms, such as methylene, dimethylene, trimethylene, tetramethylene, 2,2-dimethyltrimethylene, pentamethylene, hexamethylene, heptamethylene, and the like. Examples of ether and polyether segments include those containing from about 2 to about 25 carbon atoms, such as —CH$_2$OCH$_2$—, —CH$_2$CH$_2$OCH$_2$CH$_2$—, —CH$_2$CH$_2$OCH$_2$—CH$_2$CH$_2$CH$_2$OCH$_2$CH$_2$—, —(CH$_2$CH$_2$O)$_2$—, —(CH$_2$CH$_2$O)$_3$—, —CH$_2$CH$_2$CH(CH$_3$)OCH$_2$CH$_2$—, and the like. Examples of alkyl groups include those with from 1 to about 25 carbon atoms, such as methyl, ethyl, propyl, isopropyl, butyl, isobutyl, pentyl, 2-methylpentyl, hexyl, octyl, nonyl, decyl, and the like, with methyl, ethyl, propyl, and butyl being preferred. Aryl substituents include those with from 6 carbon atoms to about 24 carbon atoms, such as phenyl, tolyl, ethylphenyl, and naphthyl. The aryl groups can be substituted with alkoxy, hydroxy, halo, cyano, alkoxyalkyl, and the like.

Specific examples of charge transporting polyurethanes of the present invention, and suitable for incorporation into the imaging members disclosed herein include copolyurethanes represented by the following Formulas II through XII, wherein the substituents such as A, n, x and y are as defined herein; and ph is phenyl:

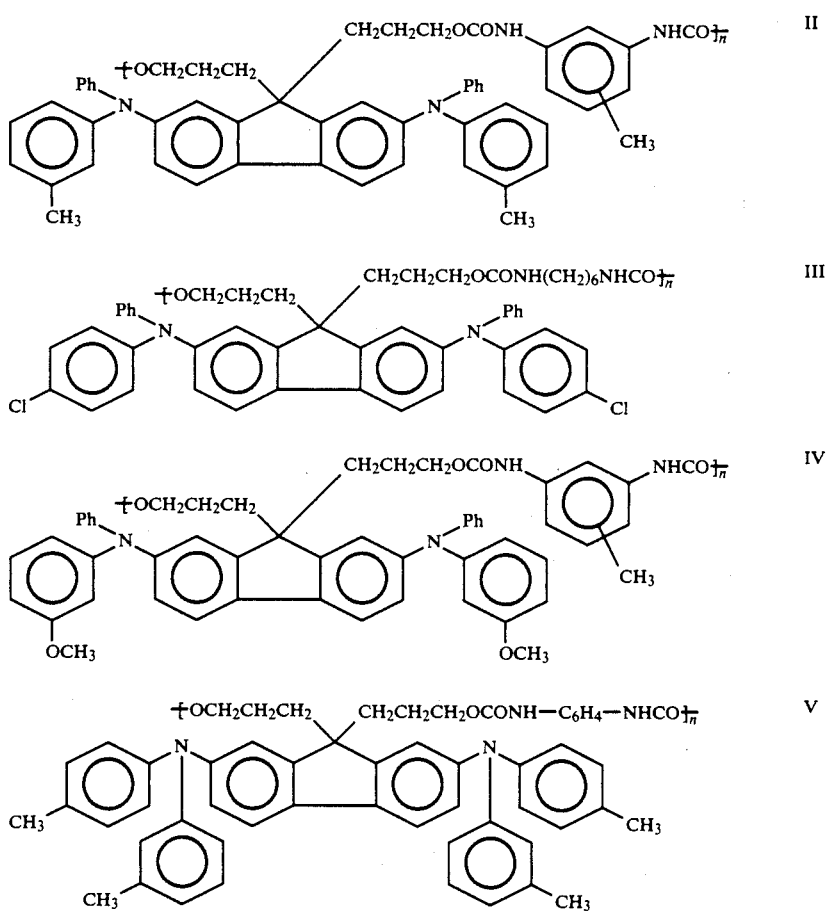

-continued
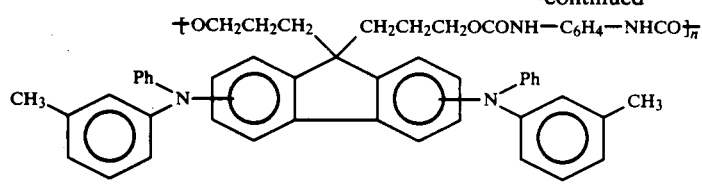 VI
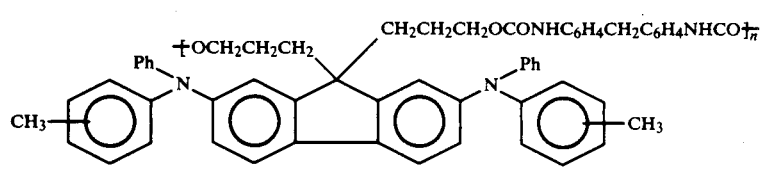 VII
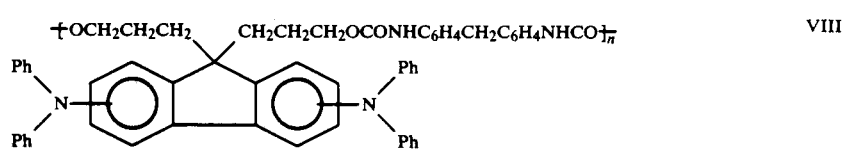 VIII
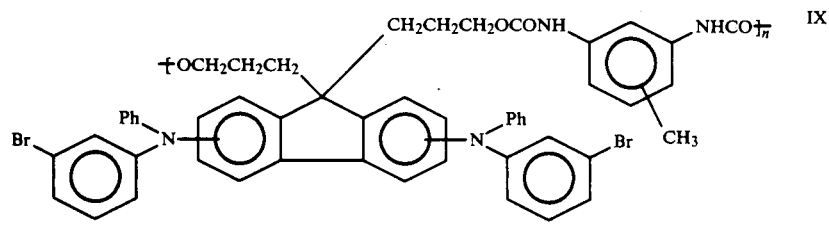 IX
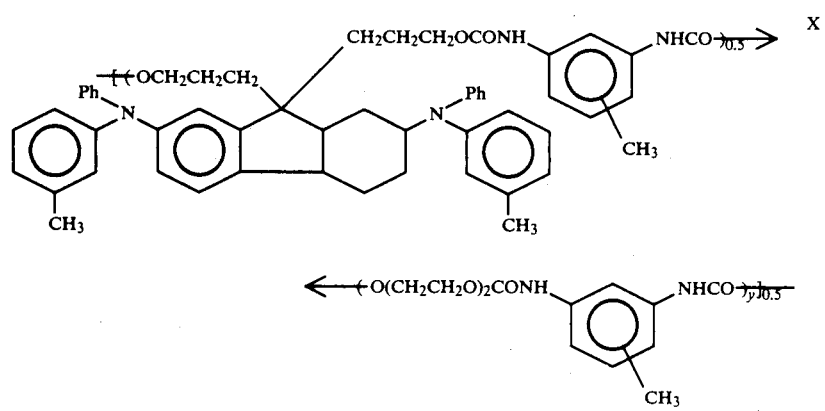 X
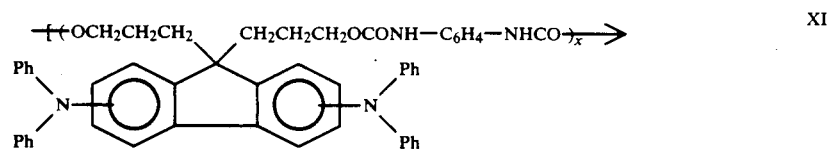 XI
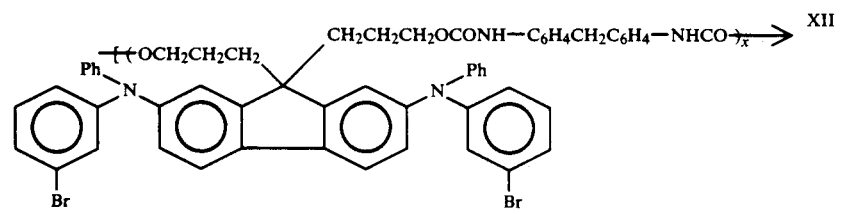 XII
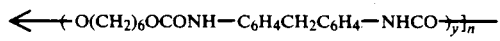

The charge transporting fluorene polyurethanes of the present invention are not believed to be commercially available but can be readily synthesized by solution polycondensation processes. Thus, for example, the polyurethanes of Formula I can be prepared by the reaction of a stoichiometric quantity of an appropriate dihydroxy-functionalized fluorene derivative with a diisocyanate in a suitable solvent such as tetrahydrofuran, dimethyl sulfoxide, dimethyl formamide, dimethyl acetamide, dioxane, ethyl acetate, and the like. The reaction can be carried with or without a catalyst at a temperature ranging from ambient temperature to about 100° C., preferably from about 50° C. to about 80° C. The catalyst of choice is di-n-butyltin dilaurate, although other catalysts such as di-n-butyltin disulfite, tri-n-butyltin acetate, ferric acetyl acetonate, triethylenediamine, triethylamine, and the like, can also be utilized. The charge transport polyurethanes are usually isolated and purified by repeated precipitation of tetrahydrofuran solutions of the formed polymers from a non-solvent such as methanol or water. For the preparation of charge transport copolyurethanes, a stoichiometric quantity of an appropriate dihydroxy comonomer is also employed.

Examples of diisocyanates that can be selected for the reaction include, benzene diisocyanate, toluene diisocyanate, hexane diisocyanate, diphenylmethane diisocyanate, cyclohexane diisocyanate, and the like. Examples of dihydroxy comonomers for the preparation of charge transport copolyurethanes include 1,5-pentanediol, 1,6-hexanediol, 1,7-heptanediol, 1,8-octanediol, ethylene glycol, diethylene glycol, triethylene glycol, 1,4-bis(2-hydroxyethoxy)benzene, and the like.

The following reaction scheme illustrates a process embodiment of the present invention:

can be prepared by providing a conductive substrate containing an optional charge blocking layer, and an optional adhesive layer; and applying thereto by solvent coating processes, laminating processes, or other methods, a photogenerating layer and the hole transporting layer.

Further, the improved photoresponsive members of the present invention can be utilized in various imaging systems; and more importantly can function simultaneously in imaging and printing processes with visible light or infrared light, wherein the members are initially charged positively or negatively; followed by imagewise exposure; development of the image with a developer composition, reference U.S. Pat. No. 4,560,635; 4,298,672 and 4,264,697, the disclosures of which are totally incorporated herein by reference, and comprised of toner particles and carrier particles; transferring the developed image to a suitable substrate, such as paper; and permanently affixing the image thereon. The imaging members of the present invention are also useful for generating colored images subsequent to development with color toner compositions.

BRIEF DESCRIPTION OF THE DRAWINGS

For a better understanding of the present invention and further features thereof, reference is made to the following detailed description of various preferred embodiments wherein.

SCHEME 1
PREPARATION OF CHARGE TRANSPORT POLYURETHANES BY MELT TRANSESTERIFICATION

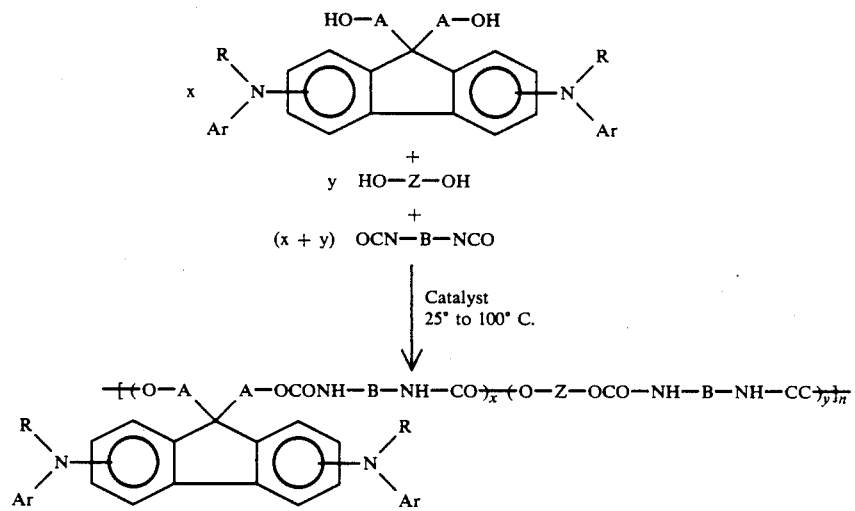

where A,B,Z,x,y and n, and the other substituents are as defined herein.

The improved photoresponsive imaging members of the present invention can be obtained by a number of known methods, the process parameters and the order of the coating of the layers being dependent on the member desired. Thus, for example, the improved photoresponsive imaging members of the present invention member of the present invention.

DESCRIPTION OF THE PREFERRED EMBODIMENTS

Figure 1:
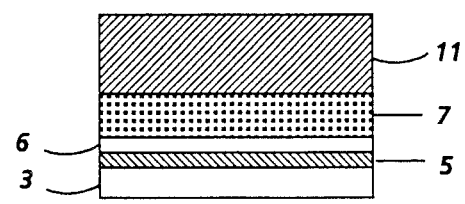
FIG. 1 is a partially schematic cross-sectional view of a photoconductive imaging member of the present invention.

Illustrated in FIG. 1 is the improved photoresponsive imaging member of the present invention comprising a substrate 3 of a thickness of 25 microns to 5,000 microns, an optional charge blocking layer 5 of a thickness of from about 2 Angstroms to about 500 Angstroms, an adhesive layer 6 of a thickness of from about 0.001 micron to about 1 micron, a charge carrier photogenerating layer 7 of thickness of a 0.05 micron to 10 microns, and a hole transporting layer 11 of a thickness of 5 microns to 60 microns comprised of the bis(alkylarylamino)fluorene or bis(diarylamino)fluorene charge transport polyesters illustrated herein.

Figure 2:
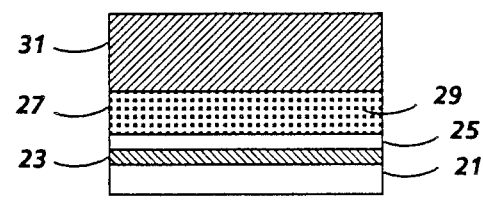
FIG. 2 is a partially schematic cross-sectional view of a second photoconductive imaging member of the present invention.

Illustrated in FIG. 2 is a second photoresponsive imaging member of the present invention comprising a supporting substrate 21 of a thickness of 25 microns to 5,000 microns, an optional charge blocking layer 23 of a thickness of from about a few Angstroms to about 500 Angstroms, an adhesive layer 25 of a thickness of from about 0.001 micron to about 1 micron, a charge carrier photogenerating layer 27 of a thickness of 0.05 micron to 10 microns of trigonal selenium or vanadyl phthalocyanine optionally dispersed in an inactive resinous binder 29, and a charge or hole transporting layer 31 of a thickness of 5 microns to 60 microns, comprised of the bis(alkylarylamino)fluorene or bis(diarylamino)fluorene charge transport polyesters of Formulas II, III, IV, V, VI, VII, VIII, IX, X, XI or XII optionally dispersed in an inactive resinous binder 33.

Figure 3:
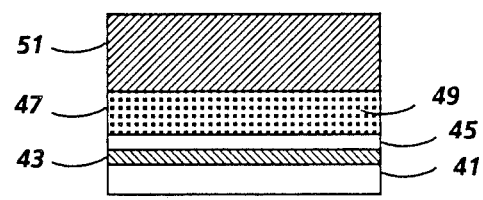
FIG. 3 illustrates a third photoresponsive imaging

Illustrated in FIG. 3 is a preferred improved photoresponsive imaging member of the present invention comprising a substrate 41 of a thickness of 25 microns to 5,000 microns, a charge blocking layer 43 of a thickness of from about a few Angstroms to about 500 Angstroms, an adhesive layer 45 of a thickness of from about 0.001 micron to about 1 micron, a charge carrier photogenerating layer 47 of a thickness of 0.05 micron to 10 microns of trigonal selenium selenium alloys or vanadyl phthalocyanine, optionally dispersed in an inactive resinous binder 49, and a hole transporting layer 51 of a thickness of 5 microns to 60 microns, comprised of bis(alkylarylamino)fluorene or bis(diarylamino)fluorene charge transport polyesters of Formulas II, III, IV, V, VI, VII, VIII, IX, X, XI or XII.

The supporting substrate layers may be opaque or transparent and may comprise any suitable material having the requisite mechanical properties. Therefore, the substrate may be comprised of a layer of nonconducting material such as an inorganic or organic polymeric material with a conductive surface layer arranged thereon, or a conductive material inclusive of, for example, a metallized organic polymeric material, aluminum, chromium, nickel, indium, tin oxide, and brass. Also, the substrate may be flexible or rigid, and may have many different configurations such as, for example, a plate, a cylindrical drum, a scroll, a seamless belt, or an endless belt.

The thickness of the substrate layer depends on many factors, including economical considerations, thus this layer may be of substantial thickness, for example, over 100 mils or of minimum thickness providing the objectives of the present invention are accomplished. In one preferred embodiment, the thickness of the supporting substrate is from about 1 mil to about 50 mils.

As optional charge blocking layers usually in contact with the supporting substrate, there can be selected various suitable known materials including aluminum oxide, polysilanes, siloxanes, reference U.S. Pat. No. 4,464,450, the disclosure of which is totally incorporated herein by reference, and the like. The primary purpose of this layer is to provide charge blocking, that is to prevent charge injection from the substrate during and after charging. Generally, this layer has a thickness of less than 50 Angstroms. The adhesive layer, which is usually situated in between the charge blocking layer and the generator layer, is typically a polymeric material, including polyesters such as DuPont 49,000 polyester, and the like. Generally, this layer has a thickness of about 0.1 micron.

Photogenerating layers can include therein known photoconductive charge carrier generating materials, such as amorphous selenium, selenium alloys, halogen doped amorphous selenium, halogen doped amorphous selenium alloys, trigonal selenium, selenite and carbonates with trigonal selenium, reference U.S. Pat. Nos. 4,232,102 and 4,233,283, the disclosures of which are totally incorporated herein by reference, copper and chlorine doped cadmium sulfide, cadmium selenide, cadmium sulfur selenide, and the like. Alloys of selenium include selenium tellurium alloys, selenium arsenic alloys, and preferably such alloys containing a halogen, such as chlorine, in an amount of from about 50 to 200 parts per million. Other photogenerating layer pigments include metal phthalocyanines, metal free phthalocyanines, vanadyl phthalocyanines, other known phthalocyanines, reference U.S. Pat. No. 3,816,118, the disclosure of which is totally incorporated herein by reference, squarylium pigments, charge transfer complex materials, and various sensitizers such as cyanine dyes, and the like; specifically inclusive of various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the tradename Monastral Red, Monastral Violet and Monastral Red Y, Vat Orange 1 and Vat Orange 3, tradenames for dibromoanthrone pigments, benzimidazole perylene, substituted 2,4diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like, and mixtures thereof may be formed as a continuous, homogeneous photogenerating layer. Benzimidazole perylene compositions are well known and described, for example, in U.S. Pat. No. 4,587,189, the entire disclosure thereof being incorporated herein by reference. Multiphotogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference.

Typically, the photogenerating layer has a thickness of from about 0.05 micron to about 10 microns or more, and preferably is of a thickness of from about 0.2 micron to about 3 microns. Generally, however, the thickness of the photogenerating layer is dependent on the photogenerating pigment loading, which may vary from about 5 percent by volume to about 100 percent by volume, and other factors inclusive of mechanical considerations, for example, and whether a flexible photoresponsive imaging member is desired. Illustrative examples of polymeric binder resinous materials that can be selected for the photogenerating layer pigments include those as disclosed, for example, in U.S. Pat. No. 3,121,006, the disclosure of which is totally incorporated herein by reference, polyesters, polycarbonate resins, polyvinyl carbazole, epoxy resins, phenoxy resins, and the like. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrene-butadiene copolymers, vinylidenechloride-vinylchloride copolymers, vinylacetate-vinylidenechloride copolymers, styrene-alkyd resins, and the like. These polymers may block, random or alternating copolymers.

Although one of the advantages of the imaging members of the present invention is the elimination of a binder for the charge transporting layer, optional resinous binders can be selected for this layer, if desired, such as the binders indicated herein for the photogenerating layer. The charge transporting compounds of the present invention, therefore, can, if desired, be dispersed in a resinous binder in an amount of from about 10 percent by weight to about 75 percent by weight, and preferably in an amount of from about 30 percent by weight to about 50 percent by weight. Illustrative specific examples of organic resinous material useful as a transport binder include polycarbonates, acrylate polymers, vinyl polymers, cellulose polymers, polyesters, polysiloxanes, polyamides, polyurethanes and epoxies, as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Also, this layer can be of various suitable thicknesses, and generally is of from about 5 microns to about 80 microns.

Furthermore, the imaging members of the present invention are particularly useful in electrophotographic, especially xerographic, imaging methods wherein negatively charged latent images are formed on the imaging member, subsequently affecting development of the image formed with a toner composition comprised of resin particles, pigment particles, and charge enhancing additives such as distearyl dimethyl ammonium methyl sulfate, reference U.S. Pat. No. 4,560,635, the disclosure of which is totally incorporated herein by reference; thereafter transferring the image to a suitable substrate and permanently affixing the image thereto by, for example, heat. Specifically, for example, conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer of this invention is sandwiched between a transport layer and a conductive surface, a negative polarity charge is normally applied prior to imagewise exposure to activating electromagnetic radiation.

The electrophotographic imaging member of the present invention exhibits for, example, excellent resistance to cracking, crazing, and are devoid of the problems of crystallization of the charge transporting compounds, undesirable phase separation of the charge transporting compounds, and elimination of minimization of leaching of the charge transporting compounds during cycling. In addition, the layered imaging members of the present invention are also suitable for use with liquid developer inks. The use of hole transport polyesters of the present invention as a single-component transport layer also assure a longterm device stability.

The invention will now be described in detail with respect to specific preferred embodiments thereof, it being understood that these examples are intended to be illustrative only. Also, the invention is not intended to be limited to the materials, conditions, and process parameters recited therein. All parts and percentages are by weight unless otherwise indicated.

EXAMPLE I 2,7-Bis(phenyl-m-tolylamino)-9,9-bis(3-hydroxypropyl)fluorene

Five hundred and fifty (550) milliliters of concentrated sulfuric acid was added slowly to 700 milliliters of water in a 3-liter roundbottomed flask cooled with an ice bath, followed by stirring with a mechanical stirrer. To this aqueous acid solution was added in small portions 168 grams of 9,9-bis(2-cyanoethyl)fluorene. The resulting mixture was then heated under reflux for three hours. After reaction completion, the precipitated white solid product was filtered, washed several times with water, and recrystallized from isopropanol to yield 161 grams of pure 9,9-bis(2-carboxyethyl)fluorene.

Subsequently, 56 grams of 9,9-bis(2-carboxyethyl)fluorene as obtained above was added to a mixture of 46 grams of iodine and 41 grams of ammonium persulfate in a mixture of 11 milliliters of concentrated sulfuric acid, 50 milliliters of water, and 240 milliliters of acetic acid. The resulting mixture was stirred mechanically, and heated at 80° C. for 12 hours. Thereafter, the precipitated white solid product, 2,7-diiodo-9,9-bis(2-carboxyethyl)fluorene, was filtered from the hot reaction mixture, washed several times with water, and dried in vacuo at 65° C. overnight.

A suspension of 2,7-diiodo-9,9-bis(2-carboxyethyl)fluorene in 600 milliliters of methanol was heated under reflux in the presence of 0.5 gram of concentrated sulfuric acid. After three hours, the reaction mixture was cooled to room temperature, and poured carefully into a swirling aqueous sodium bicarbonate solution. The precipitated diester was filtered, and washed three times with water. Recrystallization from a methanol and water mixture afforded 70 grams of pure, 99.5 percent, 2,7-diiodo-9,9-bis[2-(methoxycarbonyl)ethyl]fluorene, melting point 106° to 107.5° C.

Elemental Analysis Calculated for $C_{21}H_{20}I_2O_4$: C, 42.74; H, 3.42; O, 10.84. Found: C, 42.98; H, 3.53; O, 10.59.

$^1$H NMR (CDCl$_3$), δ (ppm): 1.4 (t, 4H); 2.3 (t, 4H); 3.55 (s, 6H); 7.4 to 8.0 (m, 6H).

IR (KBr Pellet): 1,735 cm$^{-1}$.

MS, m/e (relative intensity): 524 (100); 470 (50); 430 (35); 398 (37); 344 (38); 304 (14); 215 (12); 189 (15); 176 (42).

A mixture of 17.0 grams of 2,7-diiodo-9,9-bis[2-(methoxycarbonyl)ethyl]fluorene, 4.3 grams of copper bronze, 12.5 grams of potassium carbonate in 30 milliliters of Soltrol 220 was mechanically stirred and heated to 150° C. under a nitrogen atmosphere. Fifteen (15.0) grams of molten N-phenyl-m-toluidine was added dropwise at this temperature. After addition, the resulting mixture was heated at 210° C. under reflux for 24 hours. The hot reaction mixture was filtered, and the filter cake was washed several times with hot cyclohexane. The combined filtrate was evaporated under reduced pressure to give a brown residue which was purified by column chromatography on silica gel to afford 15.2 grams of pure 2,7-bis(phenyl-m-tolylamino)-9,9-bis[2-(methoxycarbonyl)ethyl]-fluorene, melting point 159° to 160° C.

Elemental Analysis Calculated for $C_{47}H_{44}N_2O_4$: C, 80.54; H, 6.33; O, 9.13. Found: C, 80.77; H, 6.65; O, 9.08.

$^1$H NMR (CDCl$_3$), δ (ppm): 1.7 (t, 4H); 2.15 (t, 4H); 2.25 (s, 6H); 3.55 (s, 6H); 6.8 to 7.5 (m, 24H).

IR (KBr Pellet): 1,740 cm$^{-1}$.

MS, m/e (relative intensity): 614 (2); 540 (38); 519 (20); 485 (4); 431 (32); 372 (10); 350 (100); 270 (50); 262 (30); 231 (11); 223 (15); 216 (12); 186 (11); 167 (21).

To a well-stirred solution of 8.8 grams of 2,7-bis(phenyl-m-tolylamino)-9,9-bis[2-(methoxycarbonyl)ethyl]-fluorene in 150 milliliters of dried tetrahydrofuran under a nitrogen atmosphere was added in small portions 0.52 gram of lithium aluminum hydride over a period of 15 to 30 minutes. The reaction mixture was stirred at room temperature for two hours. Ten (10) percent aqueous sodium hydroxide solution was slowly added to the reaction mixture. The organic layer was separated and evaporated to dryness under reduced pressure. The residue was dissolved in methylene chloride, and washed several times with water. Evaporation of the dry methylene chloride solution provided a white solid which was recrystallized from isopropanol and water to yield 7.8 grams of pure 2,7-bis(phenyl-m-tolylamino)-9,9-bis(3-hydroxypropyl)fluorene, melting point 216° to 217° C.

Elemental Analysis Calculated for $C_{45}H_{44}N_2O_2$: C, 83.82; H, 6.88; O, 4.96. Found: C, 83.61; H, 6.93; O, 4.91.

$^1$H NMR (CD$_2$Cl$_2$), δ (ppm): 0.95 (m, 4H); 1.3 (br s, 2H); 1.85 (m, 4H); 2.25 (s, 6H); 3.3 (t, 4H); 6.8 to 7.6 (m, 24H).

IR (KBr Pellet): 3,390 cm$^{-1}$.

MS, m/e (relative intensity): 644 (88); 540 (20); 403 (27); 385 (19); 372 (3); 357 (4); 322 (100); 270 (33); 254 (2); 216 (3); 182 (12); 167 (25).

EXAMPLE II

Synthesis of Charge Transport Polyurethane II

A mixture of 4.65 grams of 2,7-bis(phenyl-m-tolylamino)9,9-bis(3-hydroxypropyl)fluorene as obtained in Example I, 1.28 grams of toluene diisocyanate, and 3 drops of di-n-butyltin dilaurate catalyst was dissolved in 25 milliliters of dried dimethyl sulfoxide. The mixture was magnetically stirred and heated at 65° to 70° C. under an inert atmosphere for 10 hours. Thereafter, the mixture was treated with 2 milliliters of ethanol, and the reaction was continued for an additional two hours. The reaction mixture was cooled down to room temperature, diluted with 15 milliliters of tetrahydrofuran, and added slowly into 750 milliliters of water with constant stirring. The precipitated polyurethane II was filtered, washed with water, and dried. The crude polyurethane II was dissolved in 50 milliliters of methylene chloride, filtered, and precipitated again from methanol. The weight of polyurethane II was 5.23 grams after drying in vacuo at 70° C. for 12 hours. The number average molecular weight as determined by GPC was 16,700 (relative polystyrene standard).

EXAMPLE III

Synthesis of Charge Transport Polyurethane VI

The synthesis of polyurethane VI was executed in accordance with the procedure of Example II except that 1.18 grams of benzene diisocyanate was employed in place of toluene diisocyanate. The yield of polyurethane VI was 4.90 grams, and the number average molecular weight was 19,800.

EXAMPLE IV

Synthesis of Charge Transport Copolyurethane X

The synthesis of copolyurethane X was accomplished in accordance with the procedure of Example II except that a mixture of 2.32 grams of 2,7-bis(phenyl-m-tolylamino)-9,9-bis(3-hydroxypropyl)fluorene and 0.38 gram of diethylene glycol was employed in place of 4.65 grams of 2,7-bis(phenyl-m-tolylamino)-9,9-bis(3-hydroxypropyl)fluorene. The yield of copolyurethane X was 3.10 grams, and the number average molecular weight was 23,400 as determined by GPC.

EXAMPLE V

A layered photoconductive imaging member with a transport layer comprised of fluorene charge transport polyurethane II as obtained in Example II, and a trigonal selenium photogenerator was prepared as follows:

A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. Ten grams of the resulting slurry was then diluted with a solution of 0.25 gram of 9,9-bis[2-(methoxycarbonyl)ethyl]-2,7-bis(phenyl-m-tolylamino)-fluorene in 5 milliliters each of tetrahydrofuran and toluene. A 1.0 micron thick photogenerator layer was fabricated by coating the above dispersion onto an aluminized Mylar substrate with a multiple-clearance film applicator, followed by drying in a forced air oven at 135° C. for 5 minutes. A solution for the hole transport layer was then prepared by dissolving 1.5 grams of charge transport polyurethane II of Example II in 14 milliliters of methylene chloride. This solution was then coated over the photogenerator layer by means of a multiple-clearance film applicator. The resulting member was then dried in a forced air oven at 130° C. for 30 minutes resulting in an 15 microns thick transport layer.

The fabricated imaging member was then electrically tested by negatively charging it with a corona, and discharged by exposing to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponded to the surface potential. Also, the cylinder enclosing the wire loop was connected to the ground.

For this imaging member, the acceptance potential was 800 volts, the dark decay was 25 volts/second, and the residual potential was 50 volts. Further, the electrical properties of this photoreceptor member remained essentially unchanged for 1,000 cycles of repeated charging and discharging.

EXAMPLE VI

A layered photoconductive imaging member with a transport layer of fluorene charge transport polyurethane II of Example II and an amorphous selenium generator layer was fabricated as follows:

A 0.5 micron thick layer of amorphous selenium on a ball grained aluminum plate of a thickness of 7 mils was prepared by conventional vacuum deposition techniques. Vacuum deposition was accomplished at a vacuum of $10^{-6}$ Torr, while the substrate was maintained at about 50° C. A hole transport layer on top of the amorphous selenium layer was obtained by coating a solution of charge transport polyurethane II in methylene chloride using a multiple-clearance film applicator. This solution was prepared by dissolving 1.0 gram of polyurethane II in 9 milliliters of methylene chloride. Thereafter, the resulting device was dried in a forced air oven at 40° C. for 1 hour to form a 18 microns thick transport layer. Subsequently, the imaging member was cooled to room temperature, followed by electrical testing in accordance with the procedure of Example V except that a 450 nanometer monochromatic light was used for irradiation. Specifically, this imaging member was negatively charged to 900 volts and discharged to a residual potential of 60 volts. The dark decay was 25 volts/second. The electrical properties of this imaging member remained essentially unchanged for 1,000 cycles of repeated charging and discharging.

EXAMPLE VII

A layered photoresponsive imaging member with a transport layer of fluorene charge transport polyurethane VI of Example II, and a trigonal selenium photogenerator was fabricated as follows:

A 1 micron trigonal selenium photogenerator layer was prepared on an aluminized Mylar substrate in accordance with the procedure of Example V. A solution for the transport layer was prepared by dissolving 2.0 grams of polyurethane VI in 18 milliliters of methylene chloride. Thereafter, the solution was coated on top of the photogenerator layer by means of a multiple-clearance film applicator. The resulting member was then dried in a forced air oven at 130° C. for 30 minutes resulting in a dry thickness for the transport layer of 21 microns. Electrical testing was carried out in accordance with the procedure of Example V. For this imaging member, the acceptance potential was 1,000 volts, the dark decay was 20 volts/second, and the residual potential was 75 volts. The electrical properties of this imaging member remained essentially unchanged for 1,000 cycles of repeated charging and discharging.

EXAMPLE VIII

A layered photoresponsive device comprised of a transport layer of charge transport polyurethane VI of Example II doped with a transport small molecule, and an amorphous selenium photogenerator, was fabricated as follows:

A 0.5 micron thick layer of amorphous selenium on a ball grained aluminum plate of a thickness of 5 mils was prepared in accordance with the procedure of Example VI. A hole transport layer on top of the amorphous selenium layer was obtained by coating a solution of 2.0 grams of polyurethane VI and 1.0 gram of 2,7-bis(phenyl-m-tolylamino)-9,9-bis[2-(methoxycarbonyl)ethyl]-fluorene 18 milliliters of methylene chloride using a multiple-clearance film applicator. Thereafter, the resulting device was dried in a forced air oven at 40° C. for 1 hour to form a 19 micron thick transport layer.

Electrical testing was affected by repeating the procedure of Example V. For this imaging member, the acceptance potential was 950 volts, the dark decay was 35 volts/second, and the residual potential was 30 volts.

EXAMPLE IX

A layered photoresponsive imaging member with a transport layer of charge transport copolyurethane X of Example IV doped with a charge transport compound was fabricated as follows:

A 0.5 micron trigonal selenium photogenerator layer was prepared on an aluminized Mylar substrate in accordance with the procedure of Example V. A solution for the transport layer was prepared by dissolving 2.0 grams of charge transport copolyurethane X and 1.5 grams of 2,7-bis(phenyl-m-tolylamino)-9,9-bis[2-(methoxycarbonyl)ethyl]-fluorene in 18 milliliters of methylene chloride. Thereafter, the solution was coated on top of the photogenerator layer by means of a multiple-clearance film applicator. The resulting member was then dried in a forced air oven at 130° C. for 30 minutes resulting in a dry thickness for the transport layer of 20 microns. Electrical testing was carried out in accordance with the procedure of Example V. For this imaging member, the acceptance potential was 1,000 volts, the dark decay was 35 volts/second, and the residual potential was 40 volts.

EXAMPLE X

A photoresponsive device comprised of a charge transport layer of fluorene charge transport copolyurethane X, and a squarylium photogenerator was prepared as follows:

A ball grained aluminum substrate was coated with a solution of 1 milliliter of 3-aminopropyltrimethoxysilane in 100 milliliters of ethanol. The coating was heated at 110° C. for 10 minutes resulting in the formation of a 0.01 micron thick polysilane layer. A dispersion of a photogenerator prepared by ball milling a mixture of 0.075 gram of bis(N,N'-dimethylaminophenyl)squaraine and 0.13 gram of Vitel PE-200 polyester (Goodyear) in 12 milliliters of methylene chloride for 24 hours was then coated on top of the polysilane layer. After drying the coating in a forced air oven at 135° C. for 6 minutes, a 0.5 micron thick squarylium photogenerating layer was obtained.

The transport layer was prepared in accordance with the procedure of Example VII except that the charge transport copolyurethane X was employed in place of polyurethane VI. The resulting device was dried in a forced air oven at 135° C. for 30 minutes resulting in a 17 microns thick transport layer.

Electrical testing was affected in accordance with the procedure of Example V. Specifically, the device was charged negatively to 900 volts, and discharged with 830 nanometer monochromatic light. For this imaging device, the dark decay was 35 volts/second, and the residual potential was 70 volts.

EXAMPLE XI

A layered photoresponsive imaging member with a transport layer comprised of charge transport polyurethane VI and copolyurethane X was fabricated as follows:

A 0.5 micron trigonal selenium photogenerator layer was prepared on an aluminized Mylar substrate in accordance with the procedure of Example V. A solution for the transport layer was prepared by dissolving 1.0 gram each of polyurethane VI and copolyurethane X in 18 milliliters of methylene chloride. Thereafter, the solution was coated on top of the photogenerator layer by means of a multiple-clearance film applicator. The resulting member was then dried in a forced air oven at 130° C. for 30 minutes resulting in a dry thickness for the transport layer of 18 microns. Electrical testing was carried out in accordance with the procedure of Example V, and substantially similar results were obtained.

Other modifications of the present invention may occur to those skilled in the art based upon a reading of the present disclosure and these modifications are intended to be included within the scope of the present invention.

What is claimed is:

1. A layered photoresponsive imaging member comprised of a photogenerating layer, and a hole transporting layer comprised of charge transport polyurethanes of the following formula:

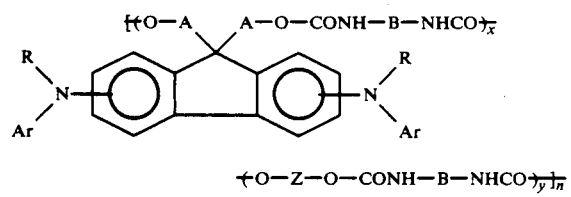

wherein A, B and Z are independently selected from the group of bifunctional linkages; R is an alkyl or aryl group; Ar is an aryl or substituted aryl group; x and y represent mole fraction numbers wherein x is greater than 0 and the sum of x and y is equal to 1.0; and n represents the number of repeating segments.

2. An imaging member in accordance with claim 1 wherein A, B, and Z are alkylene, arylene, substituted arylene, ether or a polyether.

3. An imaging member in accordance with claim 1 wherein n is a number of from about 5 to about 1,000.

4. An imaging member in accordance with claim 1 wherein R is an alkyl group containing from 1 to about 25 carbon atoms, and Ar is an aryl group containing from 6 to about 30 carbon atoms.

5. An imaging member in accordance with claim 1 wherein R and Ar are aryl groups containing from 6 to about 24 carbon atoms.

6. An imaging member in accordance with claim 1 wherein A, B or Z is alkylene group of from 1 to about 20 carbon atoms.

7. An imaging member in accordance with claim 1 wherein A B, or Z is arylene group of from 6 to about 30 carbon atoms.

8. An imaging member in accordance with claim 1 wherein B or Z is ether or polyether segment containing from 2 to about 30 carbon atoms.

9. An imaging member in accordance with claim 1 wherein R is methyl, ethyl, propyl, or butyl, and Ar is phenyl, tolyl, anisyl, ethylphenyl, propylphenyl, xylyl, halophenyl, or alkylthiophenyl.

10. An imaging member in accordance with claim 4 wherein R and Ar are selected from a group consisting of phenyl, tolyl, anisyl, ethylphenyl, propylphenyl, xylyl, halophenyl, and alkylthiophenyl.

11. An imaging member in accordance with claim 1 wherein the hole transporting polymer is represented by polyurethanes of Formulas II, III, IV, V, VI, VII, VIII, IX, X, XI or XII, wherein Ph is phenyl; x and y represent mole fraction numbers wherein x is greater than 0 and the sum of x and y is equal to 1.0; and n represents the number of repeating segments.

12. An imaging member in accordance with claim 1 wherein the photogenerating layer is comprised of metal free phthalocyanines, metal phthalocyanines, vanadyl phthalocyanines, selenium, selenium alloys, perylene or squaraine pigments.

13. An imaging member in accordance with claim 1 wherein the photogenerating layer is comprised of amorphous selenium, or trigonal selenium.

14. An imaging member in accordance with claim 12 wherein the photogenerating pigment is dispersed in a resinous binder.

15. An imaging member in accordance with claim 1 wherein the hole transporting polyurethane is dispersed in a resinous binder in an amount of from about 25 to about 75 percent by weight.

16. An imaging member in accordance with claim 1 wherein the charge transporting layer is doped with a charge transport molecule in an amount of from about 1 to about 50 percent by weight.

17. An imaging member in accordance with claim 1 containing a supporting substrate.

18. An imaging member in accordance with claim 17 wherein the supporting substrate is aluminum, nickel, or metallized Mylar.

19. An imaging method which comprises generating an electrostatic latent image on the imaging member of claim 1, followed by developing this image, subsequently transferring the image to a suitable substrate, and optionally, permanently affixing the image thereto.

20. A method of imaging in accordance with claim 19 wherein the hole transporting polymer for the imaging member is selected from the group consisting of polyurethanes represented by the Formulas II, III, IV, V, VI, VII, VIII, IX, X, XI or XII, wherein Ph is phenyl; x and y represent mole fraction numbers wherein x is greater than 0 and the sum of x and y is equal to 1.0; and n represents the number of repeating segments.

21. A printing method which comprises generating a latent image on the member of claim 1 with laser scanning, followed by developing this image, subsequently transferring the image to a suitable substrate, and optionally, permanently affixing the image thereto.

22. An imaging member in accordance with claim 1 containing a charge blocking layer, and an adhesive layer.

23. The polyurethanes of the following formula:

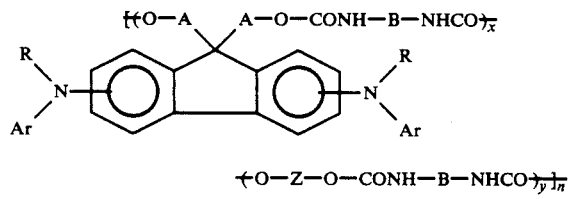

wherein A, B and Z are independently selected from the group of bifunctional linkages; R is an alkyl or aryl group; Ar is an aryl or substituted aryl group; x and y represent mole fraction numbers wherein x is greater than 0 and the sum of x and y is equal to 1.0; and n represents the number of repeating segments.

24. A polyurethane in accordance with claim 23 wherein A, B, and Z are alkylene, arylene, substituted arylene, ether or a polyether.

25. A polyurethane in accordance with claim 23 wherein n is a number of from about 5 to about 1,000.

26. A charge transport polyurethane selected from the group consisting of the polyurethanes represented by Formulas II, III, IV, V, VI, VII, VIII, IX, X, XI or XII, wherein Ph is phenyl; x and y represent mole fraction numbers wherein x is greater than 0 and the sum of x and y is equal to 1.0; and n represents the number of repeating segments.

27. An imaging member in accordance with claim 1 wherein the transport polyurethanes are doped with a charge transport compound.

28. An imaging member in accordance with claim 1 wherein the transport polyurethanes are dispersed in a resin binder.